United States Patent [19]

Muragishi et al.

[11] Patent Number: 5,129,933
[45] Date of Patent: Jul. 14, 1992

[54] METHOD OF JOINING FLAT-PLATE ELECTRODES

[75] Inventors: Isao Muragishi, Osaka; Takashi Suzuki, Toyonaka; Takashi Kanehisa, Osaka; Tetuo Hori, Kawachinagano; Asao Iguchi, Hirakata, all of Japan

[73] Assignee: Matsushita Electric Industrial Co., Ltd., Osaka, Japan

[21] Appl. No.: 522,045

[22] Filed: May 11, 1990

[30] Foreign Application Priority Data

May 17, 1989 [JP] Japan .................. 1-123222

[51] Int. Cl.[5] ............................. C03C 27/00
[52] U.S. Cl. .......................... 65/43; 65/59.1; 65/59.5; 501/15; 29/829
[58] Field of Search ............ 65/36, 43, 59.1, 59.5; 501/15; 29/825, 829

[56] References Cited

U.S. PATENT DOCUMENTS

| | | | |
|---|---|---|---|
| 3,862,830 | 1/1975 | Stern | 65/43 |
| 3,947,260 | 3/1976 | Salisbury | 65/43 |
| 3,960,534 | 6/1976 | Oates | 65/43 |
| 4,045,200 | 8/1977 | Salisbury | 65/43 |
| 4,125,307 | 11/1978 | Thayer | 445/25 |
| 4,130,408 | 12/1978 | Crossland et al. | 65/43 |
| 4,184,189 | 1/1980 | Davis et al. | 65/43 |
| 4,198,225 | 4/1980 | Patrick et al. | 65/43 |
| 4,350,515 | 9/1982 | Stewart | 65/43 |
| 4,422,731 | 12/1983 | Droguet et al. | 350/344 |
| 4,426,673 | 1/1984 | Bell et al. | 65/43 |
| 4,428,764 | 1/1984 | Snitzer et al. | 65/60.2 |
| 4,643,532 | 2/1987 | Kleiman | 65/43 |
| 4,713,575 | 12/1987 | Knapp et al. | 313/400 |
| 4,886,996 | 12/1989 | Field et al. | 313/400 |
| 4,923,422 | 5/1990 | Capek et al. | 65/43 |
| 5,021,074 | 6/1991 | Kovacik et al. | 65/43 |

*Primary Examiner*—W. Gary Jones
*Assistant Examiner*—John J. Bruckner
*Attorney, Agent, or Firm*—Stevens, Davis, Miller & Mosher

[57] ABSTRACT

A method and apparatus for joining flat-plate electrodes wherein a spacer, to which a joining material such as a low-melting-point crystallized glass containing a crystallization promoting agent is applied, is interposed between the electrodes to be joined. The electrodes and spacer are placed and held between upper and lower attraction dies. The upper and lower attraction dies are placed between upper and lower heating blocks for heating and pressing the electrodes and spacer through the attraction dies to join the electrodes via molten joining material.

1 Claim, 3 Drawing Sheets

METHOD OF JOINING FLAT-PLATE ELECTRODES

BACKGROUND OF THE INVENTION

1. Field of the Invention

This invention relates to a method and an apparatus for joining a plurality of flat-plate electrodes adapted to, e.g., a flat type display unit while spacing the electrodes from each other by a predetermined small distance.

2. Description of the Prior Art

Conventionally, flat-plate electrodes for use in a flat type display unit are joined to each other as described below. Referring to FIG. 3, spacers 32 having two major surfaces to which a glass frit 33 of a low-melting-point bonding glass is applied are interposed between a plurality of flat-plate electrodes 31, that is, the flat-plate electrodes 31 and the spacers 32 are alternately superposed on each other. This stack of the flat-plate electrodes and the spacers 32 is placed on a firing base plate 34, and a stamper 35 is placed on the stack to impose a constant load on the same. In this state, these members are inserted into a firing furnace 36 and are heated at a temperature equal to or higher than a predetermined temperature to melt the glass frit 33, thereby joining the flat-plate electrodes 31 while interposing the spacers 32 therebetween. In FIG. 3, numeral 37 denotes a fan serving to make the heating temperature in the furnace uniform. Numeral 36 denotes positioning pins provided to position the flat-plate electrodes 31 and the spacers 32 relative to each other.

This joining method includes the steps of increasing the temperature in the furnace after inserting the members into the furnace, maintaining the furnace temperature at the set point for a predetermined period of time, reducing the furnace temperature and thereafter removing the members. Therefore the time taken for the joining process is long and the productivity is considerably low. There is a risk of extraneous substances attaching to the electrodes because the furnace atmosphere is agitated by the fan in order to make the furnace temperature uniform. Moreover, even if the constant load is uniformly applied to the electrodes and the spacers by means of a stamper, a problem of difficulty in improving the joining accuracy with respect to the degree of parallelism and the spacing between the flat-plate electrodes is encountered because of dispersion of the heating temperature distribution, dispersion of the glass frit composition, non-uniformity of the applied state of the glass frit, and so on.

SUMMARY OF THE INVENTION

In view of these problems of the prior art, it is an object of the present invention to provide a method and an apparatus for joining flat-plate electrodes capable of joining the flat-plate electrodes with an improved productivity, free from the risk of attachment of extraneous substances at the time of joining, and capable of improving the joining accuracy.

To this end, according to the present invention, there is provided a method of joining flat-plate electrodes, including: interposing, between flat-plate electrodes to be joined, a spacer to which a joining material including a low-melting-point crystallized glass containing a crystallization promoting agent is applied; placing the flat-plate electrodes and the spacer between upper and lower heating blocks; and heating the flat-plate electrodes and the spacer while pressing same to melt the joining material for joining.

A brazing metal or a high melting-point amorphous material may be used as the joining material instead of the low-melting-point crystallized glass.

Preferably, upper and lower dies are interposed between the upper and lower heating blocks and the flat-plate-electrodes, and joining is effected while the flat-plate electrodes adjacent to the upper and lower dies are being attracted by these dies.

An apparatus for joining flat-plate electrodes in accordance with the present invention has upper and lower heating blocks incorporating heaters and capable of being relatively moved closer to or away from each other; a pressing means for pressing the heating blocks in the direction of closing movement of same; upper and lower dies abutting against opposed surfaces of the heating blocks; and a multiplicity of suction holes formed in opposed surfaces of the upper and lower dies.

According to the present invention, the spacer to which a joining material is applied is interposed between the flat-plate electrodes and is heated by the heating blocks, and a low-melting-point crystallized glass to which a crystallization promoting agent is added is used as the joining material, thereby making it possible to join the flat-plate electrodes by melting the joining material in a short time. The producibility of a flat-plate electrode assembly is thereby improved. It is also possible to make the temperature distributions on the heating blocks uniform and, hence, to uniformly heat the flat-plate electrodes at the time of joining. There is therefore no need for agitating the atmosphere to make the heating temperature uniform. Also, there is no risk of attachment of extraneous substances at the time of joining. The members to be joined are pressed by the heating blocks, and they can be joined with high accuracy by making the displacement of the heating blocks during pressing uniform.

In accordance with this method, a brazing metal or a high melting-point amorphous glass can be used as the joining material instead of the low-melting-point crystallized glass.

Further, the flat-plate electrodes can be attracted by the upper and lower dies to be prevented from locally sagging during joining, so that they can be joined with a high degree of flatness.

The above and other objects, features and advantages of the present invention will be made more apparent by the following description with reference to the accompanying drawings.

BRIEF DESCRIPTION OF THE DRAWINGS

FIG. 1 is a longitudinal cross-sectional view of an apparatus for joining flat-plate electrodes, showing a joining state;

FIG. 2 is a plan view of the flat-plate electrodes, showing attraction positions.

DESCRIPTION OF THE PREFERRED EMBODIMENT

An embodiment of the present invention will be described below with reference to FIGS. 1 and 2.

Figure 1:
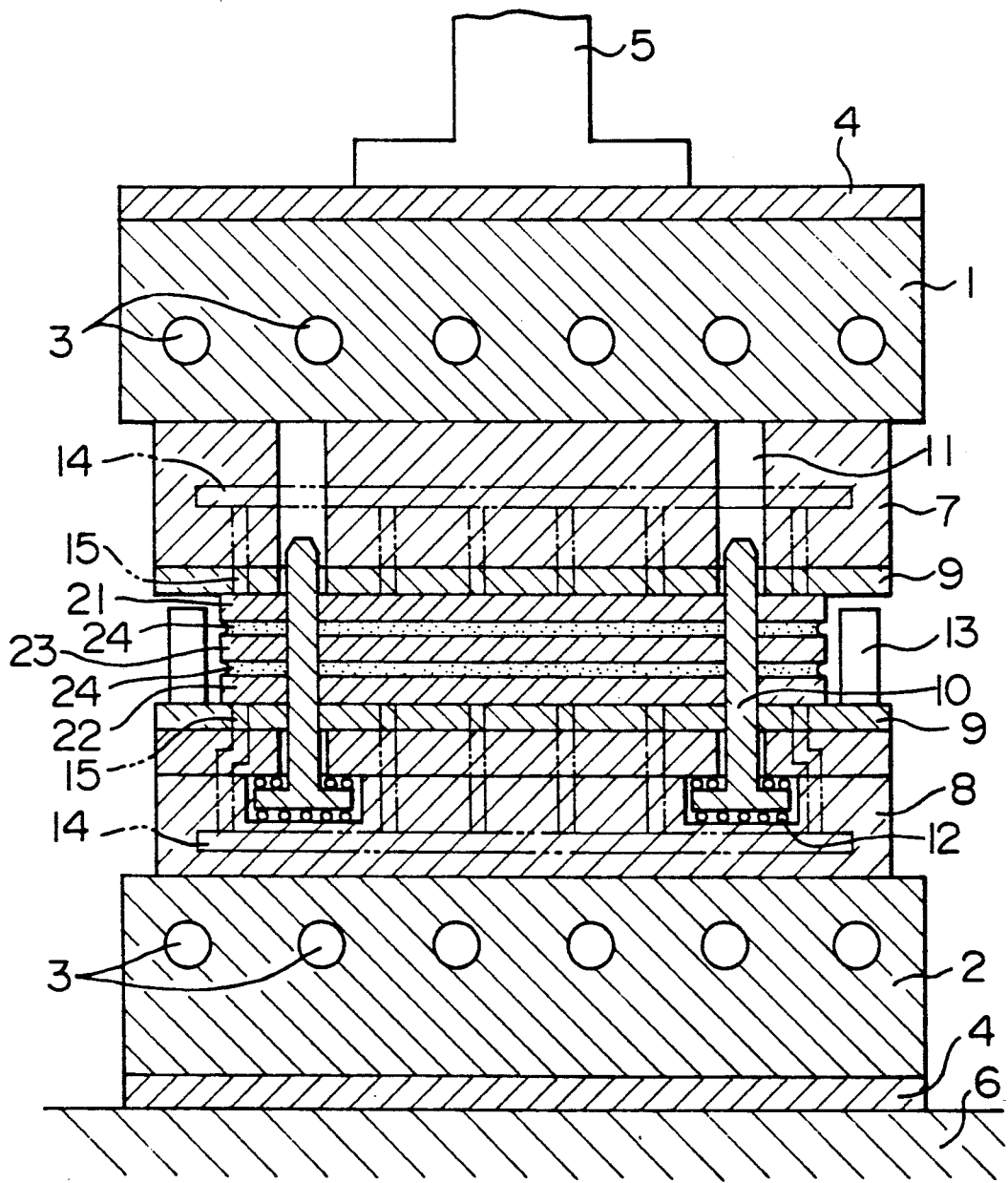
FIGS. 1 and 2 show an embodiment of the present invention.

Referring to FIG. 1, an upper heating block 1 and a lower heating block 2 each incorporating heaters 3 are provided. The temperatures of the heating blocks 1 and 2 is controlled by a control means (not shown) so that the temperature distributions on the opposed surfaces of these blocks are made uniform. The upper and lower heating blocks 1 and 2 are mounted on a ram 5 provided as a lifting/driving means and a base 6, respectively, with adiabatic plates 4 interposed therebetween. The upper heating block 1 is supported by guide rods (not shown) standing on the base 6 so as to be movable in the vertical direction.

Upper and lower dies 7 and 8 are provided on the opposed surfaces of the upper and lower heating blocks 1 and 2. Protective plates 9 formed of the same material as flat-plate electrodes which are to be joined to each other are attached to opposed surfaces of the upper and lower dies 7 and 8. A plurality of positioning pins 10 for positioning the flat-plate electrodes project upward from the lower die 8. Fitting holes 11 in which the positioning pins 10 are fitted are formed in the upper die 7. The positioning pins 10 are mounted on movable balls 12 so as to be displacable to a small extent in horizontal directions to absorb thermal expansion of the flat-plate electrodes. A plurality of stoppers 13 for uniformly setting the distances between the flat-plate electrodes stand on outer peripheral portions of the lower die 8.

Figure 2:
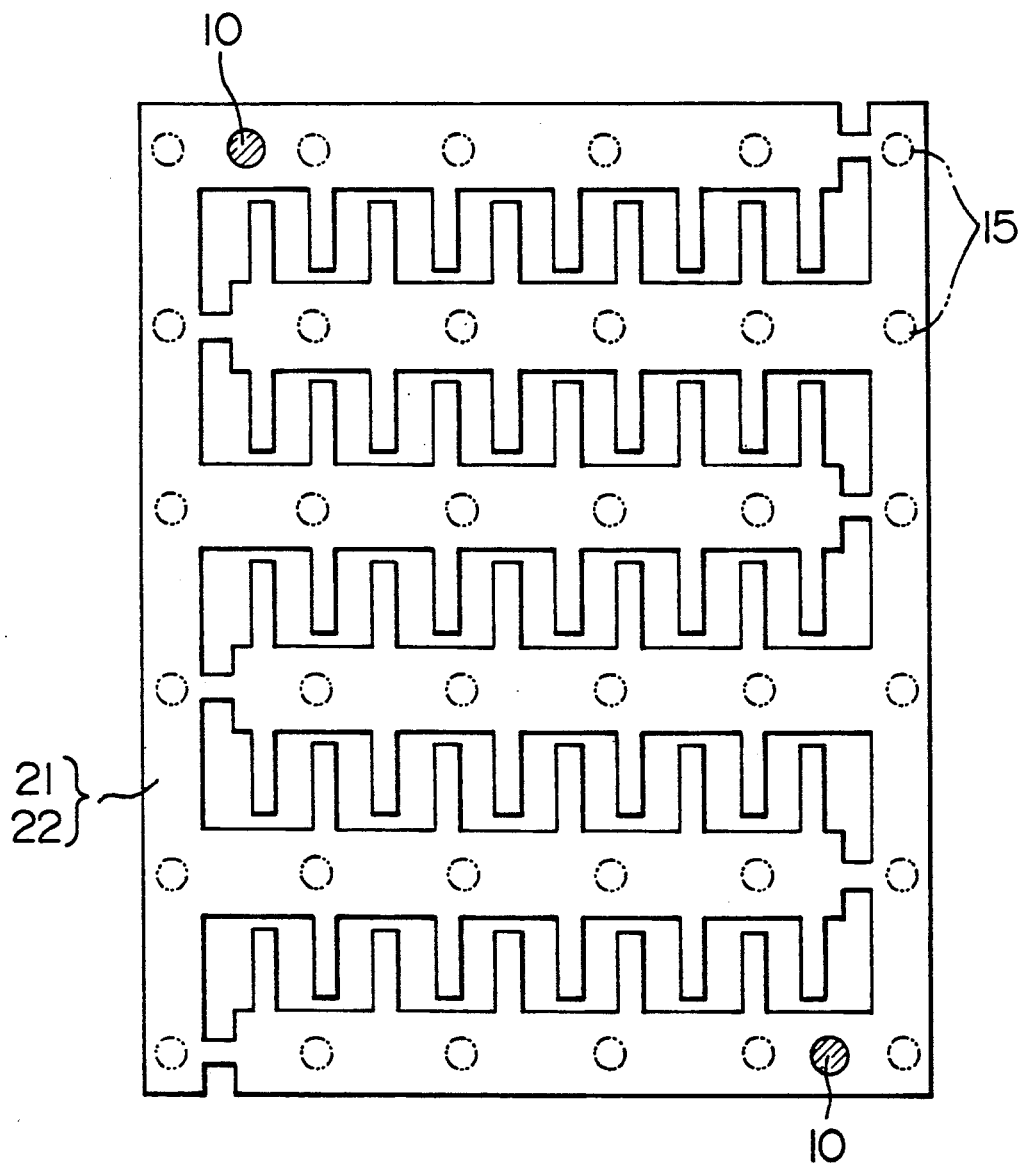
Figure 3:
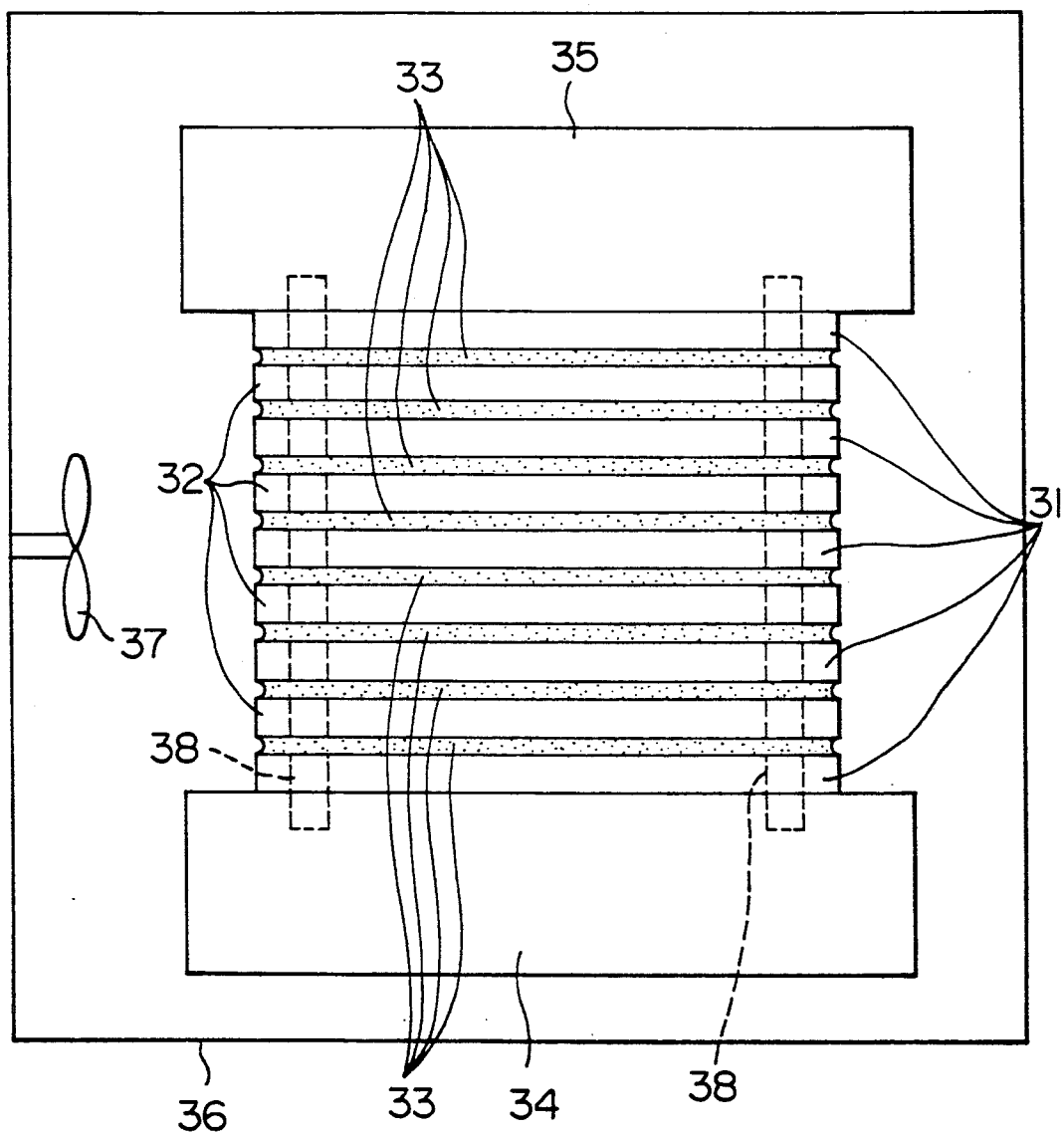
FIG. 3 is a front view of a conventional apparatus for joining flat-plate electrodes, showing a joining state.

As indicated by the double-dot-dash line in FIGS. 1 and 2, suction passages 14 which can be connected to a suction source (not shown) are formed in the upper and lower dies 7 and 8, and a multiplicity of suction holes 15 are also formed in the dies so as to communicate with the suction passages and to open in the opposed surfaces of the upper and lower dies 7 and 8, thereby enabling the whole surfaces of the flat-plate electrodes to be attracted at the time of joining. The suction holes 15 have a diameter of 0.1 to 0.5 mm selected to obtain a sufficient suction force while avoiding excessively cooling the dies.

The operation of joining a pair of plates having flat-plate electrodes 21 and 22 while interposing a spacer 23 therebetween will be described below.

A joining material 24 is applied to the two surfaces of the spacer 23 in accordance with patterns corresponding to the configuration of the flat-plate electrodes 21 and 22. The spacer 23 is interposed between the pair of plates having flat-plate electrodes 21 and 22. The flat-plate electrodes 21 and 22 and the spacer 23 thereby superposed are placed on the lower die 8 while being positioned by the positioning pins 10. The upper and lower dies 7 and 8 are constantly heated at 450° to 700° C. by the heating blocks 1 and 2, respectively. This heating is always controlled so that the temperature distributions over the whole surfaces of the dies 7 and 8 are uniform. The ram 5 is then operated to press the upper die 7 toward the lower die 8 by a predetermined pressing force.

Then, the flat-plate electrodes 21 and 22 are uniformly heated by the heating blocks 1 and 2 through the upper and lower dies 7 and 8, and the joining material 24 is heated through the flat-plate electrodes 21 and 22 to be molten, thereby joining the flat-plate electrodes 21 and 22 by the joining material while interposing the spacer 23 therebetween. At this time, the joining material 24 is uniformly heated and molten over the whole joining surfaces of the electrodes 21 and 22 while the distances between the flat-electrodes plates 21 and 22 are constantly maintained by the stopper 13. During the pressing, the suction passages 14 are connected to the suction source and the flat-plate electrodes 21 and 22 are attracted to the lower and upper surfaces of the upper and lower dies 7 and 8 through the suction holes 15, thereby eliminating the possibility of local sagging of the flat plates 21 and 22 even when the joining material 24 is molten for joining. As a result, the flat-plate electrodes 21 and 22 are joined to each other while a high degree of flatness is maintained therebetween.

The ram 5 is returned a suitable time after bringing the upper die 7 into contact with the stoppers 13 when the joining material 24 is molten, thereby lifting the upper heating block 1 together with the upper die 7. Thereafter, the electrodes 21 and 22 joined to each other with the spacer 23 interposed therebetween are removed from the lower die 8.

The pair of the plates having the flat-plate electrodes 21 and 22 are thus joined to each other with the spacer 23 interposed therebetween, thereby increasing the total rigidity. The flat-plate electrodes are thereby made easy to position and fix. It is possible to easily and efficiently form groups of electrodes by combining a plurality of flat-plate electrode units constructed as described above.

The joining material 24 used in accordance with the above-described joining method is, preferably, a low-melting-point crystallized glass to which a crystallization promoting agent is added. More preferably, $B_2O_3$-PbO-ZnO glass or a low-melting-point crystallized glass prepared by adding $SiO_2$ and $AlO_3$ to this glass is used, and 0.01 to 0.1% by weight of crushed glass having the same composition and previously crystallized is added as a crystallization promoting agent. Ordinarily, $ZrO_2$ is used as a crystallization promoting agent. However, it is not possible to greatly increase the crystallization speed by using this compound, and the use of this compound entails a problem of the thermal expansion coefficient being reduced if the amount of addition is increased.

A brazing metal such as a Cu-Ag metal not melting at temperatures equal to or lower than 450° C. or a metal formed by adding Sn, Pb, Zn and/or In to Cu-Ag metal can be used as the joining material 24 instead of the low-melting-point crystallized glass. In this case, the spacer 23 must have insulating properties; it may be a member which has insulating properties at least at its surfaces and whose surfaces are metallized to enable brazing.

Further, the joining material 24 may be a high-melting-point amorphous glass such as a $B_2O_3$-PbO-$SiO_2$ glass not melting at temperatures equal to or lower than 450° C. or a glass prepared by adding ZnO and/or $Al_2O_3$ to $B_2O_3$-PbO-$SiO_2$ glass.

The temperature of 450° C. is a temperature at which a glass casing in which the electrodes are housed is heated for joining in the process of manufacturing a flat type display unit. If the joining material 24 is molten at a temperature equal to or lower than this glass casing heating temperature, the electrodes are disjoined during joining of the glass casing.

In the above-described embodiment, the upper and lower dies 7 and 8 in which suction holes 15 are formed are provided in association with the heating blocks 1 and 2. However, the flat-plate electrodes 21 and 22 may be directly heated by the heating blocks 1 and 2.

As described above, in the method of joining flat-plate electrodes in accordance with the present invention, the spacer to which a joining material is applied is interposed between the flat-plate electrodes and is heated by the heating blocks, and a low-melting-point crystallized glass to which a crystallization promoting agent is added is used as the joining material, thereby making it possible to join the flat-plate electrodes by melting the joining material in a short time. The producibility of a flat-plate electrode assembly is thereby improved. It is also possible to make the temperature distributions on the heating blocks uniform and, hence, to uniformly heat the flat-plate electrodes at the time of joining. There is therefore no need for agitating the atmosphere to make the heating temperature uniform. Also, there is no risk of attachment of extraneous substances at the time of joining. The electrodes can be joined with high accuracy by making the displacement of the heating blocks during pressing uniform.

In accordance with this method, a brazing metal or a high melting-point amorphous glass can be used as the joining material instead of the low-melting-point crystallized glass. The range of application of joining materials is wide.

Further, the flat-plate electrodes can be attracted by the upper and lower dies to be prevented from locally sagging during joining, so that they can be joined with a high degree of flatness. The method of the present invention can readily be carried out by using the flat-plate electrode joining apparatus of the present invention.

It should be understood that the foregoing relates to only a preferred embodiment of the invention, and that various changes and modifications may be made in the invention without departing from the spirit and scope thereof.

What is claimed is:

1. A method of joining flat-plate electrodes, comprising the steps of:
   interposing, between a pair of flat-plate electrodes to be joined, a spacer to which a joining material including a low-melting-point crystallized glass containing a crystallization promoting agent is applied;
   placing a pair of upper and lower dies between a pair of upper and lower heating blocks;
   placing the flat-plate electrodes between the upper and lower dies; and
   joining said electrodes by employing said upper and lower heating blocks to heat the flat-plate electrodes and the spacer and melt the joining material while (i) applying by means of the upper and lower dies, an attraction force to attract the flat plate electrodes to the upper and lower dies respectively and (ii) pressing the flat plate electrodes and the spacer between the upper and lower attracting dies by causing relative movement between the upper and lower heating blocks to bring them closer together.

* * * * *